Dec. 23, 1941.   C. WALDEYER   2,266,833
MOTION PICTURE PROJECTOR
Filed Oct. 16, 1939   3 Sheets-Sheet 3

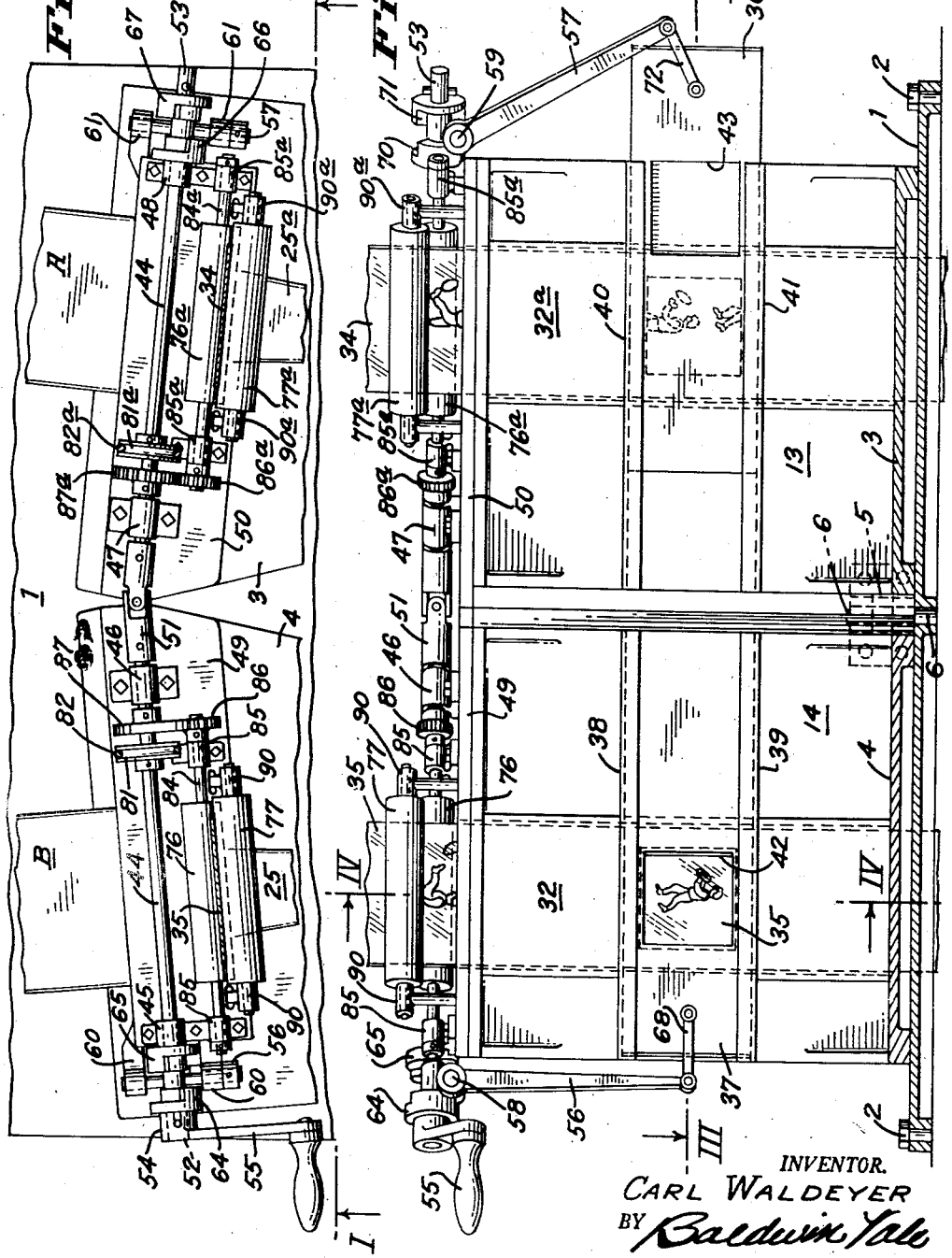

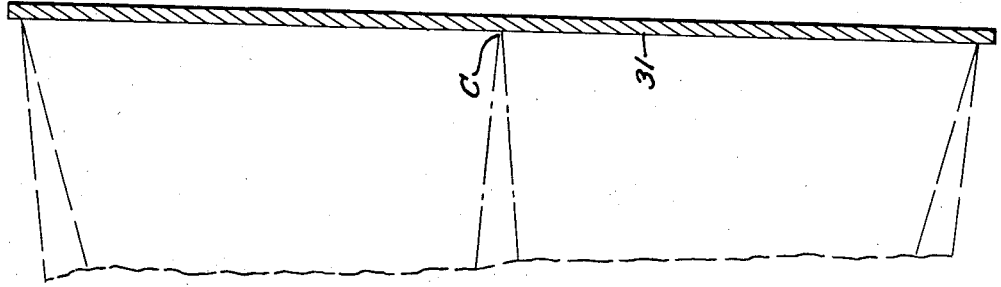
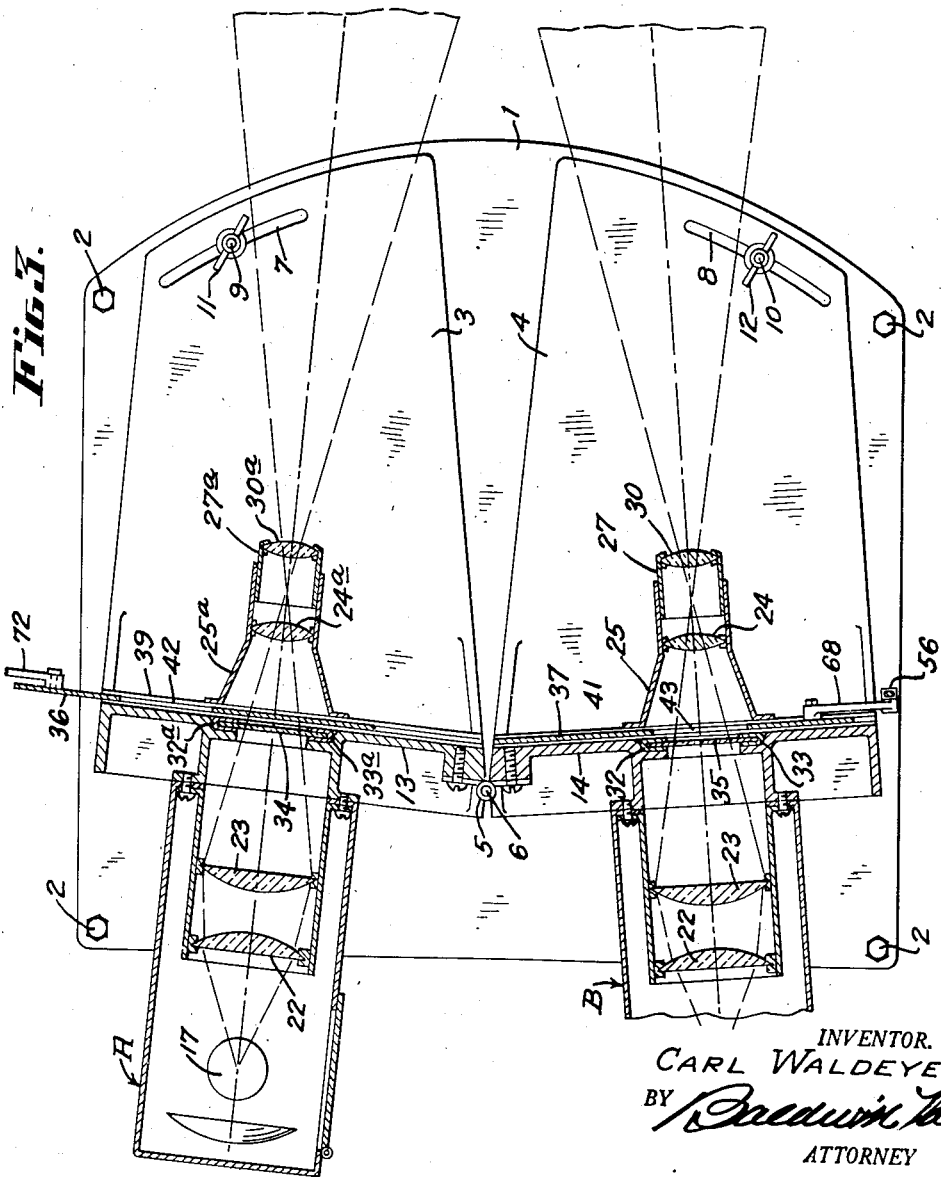

INVENTOR.
CARL WALDEYER
BY Baldwin Yale
ATTORNEY

Patented Dec. 23, 1941

2,266,833

UNITED STATES PATENT OFFICE 2,266,833

MOTION PICTURE PROJECTOR

Carl Waldeyer, San Francisco, Calif.

Application October 16, 1939, Serial No. 299,628

8 Claims. (Cl. 88—16.6)

This invention relates to improvements in motion picture projectors and, more particularly, to the duplex type thereof.

Among the objects of the invention is to relieve eyestrain and produce greater realism on the screen.

Another object is to maintain constant illumination of the projection screen.

Another object is to produce a more vivid projected image by providing a motion picture machine adapted to project motion pictures without relying to such an extent as heretofore on that peculiarity of the eye called "persistence of vision."

Another object is to reduce the speed of the films and improve the merging of the successively exposed images.

Another object is to increase the size of the film pictures to improve the projection of outdoor or daylight pictures.

Another object is to provide a motion picture machine adapted to project motion pictures by the use of either opaque ribbons or transparent or translucent films.

A further object is to provide a motion picture machine adapted to project motion pictures by the use of films or ribbons on which the characters or pictures are produced by means other than a photographic process; by printing, drawing, or any other means that does not require the use of sensitized film and photographic impressions on same. A further object is to provide a motion picture machine which is self-contained and adapted to have mounted on its base plates projector lanterns for either opaque or transparent projection; said lanterns to be in separate casings and adapted to be adjustably mounted on the said motion picture machine, either without fastening or joined thereon in any suitable manner.

Other objects and advantages will appear as the description progresses.

In this specification and the accompanying drawings, the invention is disclosed in its preferred form. But it is to be understood that it is not limited to this form, because it may be embodied in modifications within the purview of the claims following the description.

In the three sheets of drawings:

Fig. 1 is a front elevation, partly in cross section on the line I—I, Fig. 2, of a picture projecting machine constructed in accordance with this invention and shows a motion picture machine as a self-contained device, without lantern mounts.

Fig. 2 is a fragmentary plan view from above of the driving gear, the front and rear of the machine being broken away.

Fig. 3 is a plan view from above in horizontal section on the line III—III, Fig. 1.

Figure 4:
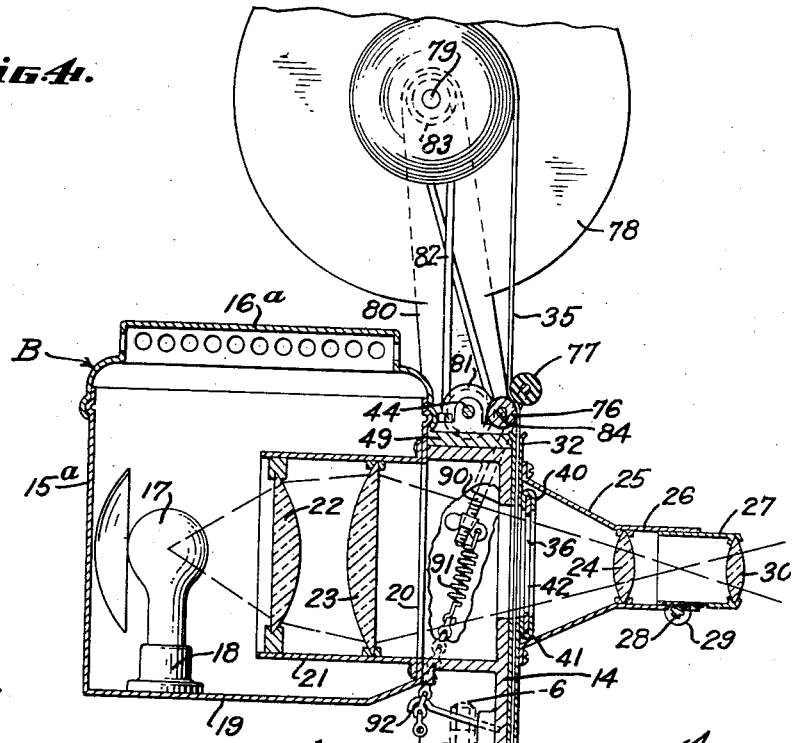
Fig. 4 is a vertical section of the same on the line IV—IV, Fig. 1.

In detail, the construction illustrated in the drawings, referring first to Fig. 3, comprises the bed 1 bolted to any suitable support, as at 2. The adjustable base plates 3, 4 are hinged at 5 to the vertical pintle or pivot 6 that is fixed on the bed 1. These plates have the slots 7, 8 engaging their respective bolts 9, 10 fixed in the bed 1 and provided with the wing nuts 11, 12 by which the base plates are fixed in adjusted positions on the bed 1.

The vertical front walls 13, 14 are integrally formed on their respective adjustable base plates 3, 4 to provide suitable mountings for the duplex projectors A, B, see Figs. 3, 4. These projectors are alike in construction and function and only one will be described in detail. The same reference characters will be used on the companion projector with the addition of the letter a. The projectors comprise the housings 15, 15a having the ventilated removable covers 16, 16a.

The lamp 17 is screwed into the base 18 that is fixed to the bottom 19 in alinement with the opening 20 of the housing. The flanged condenser tube 21 surrounds this opening and projects in approximate axial alinement with the filament of the lamp 17 or other source of light. The lenses 22, 23 are mounted within this tube to form a compound refractor for focusing the light rays on the intermediate lens 24 suitably mounted within the tapered cowl 25 that is fixed to the front wall 14 and has the neck 26.

The focusing tube 27 telescopes within this neck and has a toothed rack enmeshed with the pinion 28 mounted on the neck and adapted to be manually rotated by the knurled knob 29. This is the conventional arrangement for focusing the objective lens 30 mounted in the front end of the tube 27 coaxially with the intermediate lens 24.

The focusing combination of lenses reverses the light rays and projects the picture right side up and in enlarged proportions on the receiving screen 31. By swinging the base plates 3, 4 on the pivot 6 and setting the wing nuts 11, 12, both projectors A, B are accurately focused at the point C in the center portion of the screen 31 with the objective lens 30 properly adjusted for sharp definition of the projected images.

The front walls 13, 14 are each provided with a pair of interspaced channel guides 32, 33 and 32a, 33a respectively, to form vertical guide slots adapted to guide their respective picture films 34 and 35 through the focal plane of the lenses in the usual manner and are so constructed that the respective films encounter a slight frictional resistance in passing therethrough.

The shutters 36, 37 are similarly guided through the focal plane laterally in the horizontal guides 38, 39, 40, 41, respectively; see also Fig. 1. These shutters have the openings 42, 43 respectively to alternately expose and stop the light passing through the films. These shutters are driven in alternate relation so that one film is dark while the other is light. The sequence of pictures alternates from one film to the other to create the optical illusion of motion without at any time reducing the intensity of light projected upon the screen 31, in this manner minimizing the necessity for relying upon the persistence of the receding image in the eyes of the observer. Due to the relative slow speed of the respective films in comparison with conventional motion picture practice, it is imperative that the openings 42, 43 of the shutters be so arranged and actuating means for the movement of the respective shutters 36, 37 be so timed that when a picture is in an exposure position the opening of the respective shutter shall register with the picture, and the shutter must remain at rest for the full time the picture is in its exposure position; and when the picture begins to move away from its exposure position the opaque portion of the shutter must instantaneously interpose itself between the picture and the screen. The new image comes on to the screen at the same instant that the old image vanishes, thus reproducing very nearly the effect of normal observation of motion. In this manner no unnatural strain is imposed upon the eyes of the observer.

The driving mechanism for actuating the shutters and the films in timed sequence is best shown in Figs. 1, 2. The main driven shaft 44 is mounted in the bearings 45, 46 and 47, 48 fixed to the top flanges 49, 50 of the front walls 13, 14 respectively. This shaft 44 has the universal joint 51 interposed therein in vertical alinement with the hinge pivot 6 to compensate for the angular movement of the base plates 3, 4.

The opposite ends of the shaft 44 are respectively provided with the cross pins 52, 53 to selectively engage the slotted hub 54 of the crank 55 for manually rotating the main shaft.

The shutter actuating means are duplicated at opposite sides of the apparatus. The shutter arms 56, 57 are fixed upon their respective cross shafts 58, 59 that oscillate in their respective bearings 60, 60 and 61, 61, forming parts of the bases 49, 50. The hubs of these arms are cut away on opposite sides to form shoulders as at 62, 63 in Fig. 5 for alternate impingement of the cams 64, 65 and 66, 67, fixed on the opposite ends of the main shaft 44 to alternately swing the arms 56, 57.

Figure 5:
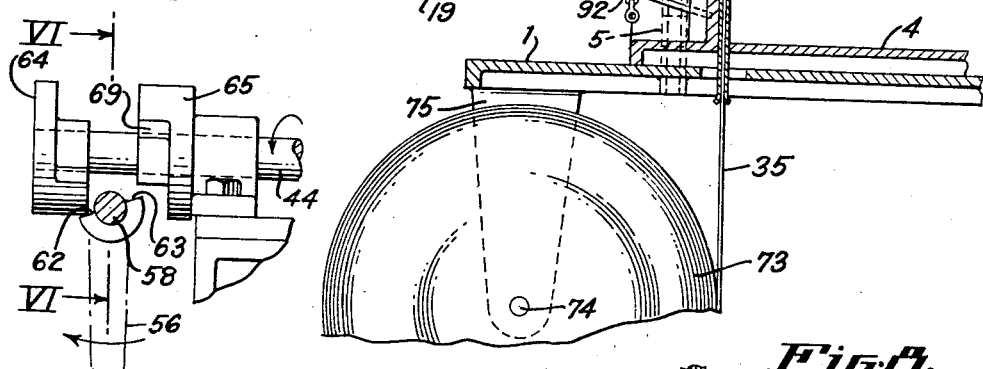
Fig. 5 is an enlarged detail in front elevation of the shutter actuating mechanism.
Figure 6:
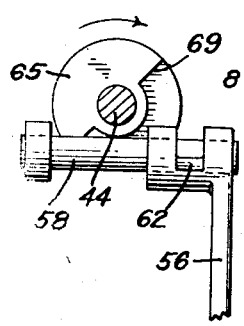
Fig. 6 is a vertical section of the same on the line VI—VI, Fig. 5.

In Fig. 5 the cam 64 has made impact with the shoulder 62 to swing the arm 56 to the right and hold it positively in this position, see also Fig. 1. This movement acting through the link 68 has moved the shutter 37 to the right to bring the opening 42 into the focal plane to expose the inverted picture on the film 35. When the corner 69 on the cam 65 impacts the shoulder 63, the arm 56 will be instantly thrust to the left in the direction of the arrow in Fig. 5 to reverse the effect and black out the film 35 by means of the opaque portion of the shutter 37.

The cam corners 70 and 71 impinging on the shoulders on the hub of the arm 57, having the link 72 pivoted to the shutter 36, and also actuated by the main shaft 44, synchronously black out the film 34 when the film 35 is exposed, and vice versa.

The film feeding and timing mechanisms for the films 34, 35 are alike and only one will be described in detail and the same reference numerals applied to the other with the addition of the letter a. Referring to Fig. 4, the conventional type of film reel 73 is journaled on the stud pin 74 fixed in the bracket 75 projecting below the bed 1.

The film passes upwardly through the film guide 32—33 and between the traction roller 76 and the pressure roller 77. The exposed film is progressively taken up on the reel 78 mounted on the shaft 79 journaled on the bracket 80 extending above the projector B. This shaft 79 is driven by the pulley 81 on the shaft 44 and the elastic belt 82 passing over the pulley 83 on the shaft 79.

Figure 7:
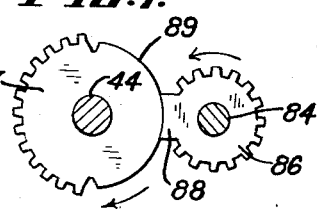
Fig. 7 is a diagrammatic side view detail of the mutilated gear drive for the film feed mechanism.

The traction roller 76 is fixed on the countershaft 84 mounted in the bearings 85, 85 on the base 49, see Fig. 2. This countershaft is driven intermittently by the mutilated pinion 86 engaging the cooperating drive gear 87 fixed on the main shaft 44, see Fig. 7. The pinion has the concave lug 88 bearing against the periphery 89 of the gear 87 to hold the traction roller 76 stationary during the projection interval of the picture on the film 35. This interval is timed in synchronism with the opening in the shutter 37 until the gear and pinion teeth engage to advance the film the distance of one "frame" during the blackout period of the shutter 37. The length of frame is determined by the diameter of the traction roller 76.

The idle pressure roller 77 is journaled in the upper ends of the rods 90, 90a, see Figs. 2, 4. These rods are slidably guided in the base 49 and force the film 35 against the traction roller 76 under the tension of springs such as 91, adjustably anchored to the front wall 14 at 92. The traction roller and the tension roller are slightly offset, see Fig. 4, to bend the film and increase the contact area against the traction roller 76 to insure a non-slipping film feed. The inertia of the feed roll 73 prevents the film from over-riding the feed and keeps the film 35 taut. Sprocket teeth engaging marginal perforations in the films could be added, but practice has demonstrated that this precaution is not always required in synchronizing the films with each other and their respective shutters in the present invention. This advantage is largely due to the relatively slow speed and increased area of the films as compared with the conventional motion picture practice which requires projecting approximately sixteen frames per second as against about two to four frames per second in the present instance. There is the further advantage of greatly simplified threading and justifying the film in the present apparatus, as compared with the looping of the film in conventional sprocket drive at the higher speeds.

This invention operates substantially as follows: The focus of the light beams from the projectors A, B is separately adjusted on different parts of the screen 31 by the nobs 29 to insure uniformity in illumination values. The bases 3, 4 are then swung on the common pivot 6 and locked by the wing nuts 11, 12 so that the light beams of the projectors A, B fuse at a focal center in the middle of the screen 31.

Since the pictures are arranged in alternate sequence between the companion films 34, 35, it is important that picture number two on the second film follow picture number one on the leading film. Turning the crank 55 clockwise will cause the apparatus to automatically feed the companion films intermittently through the mutilated gear drives 86, 87 in alternate timing with their respective shutters to project the pictures in alternating sequence upon the screen 31, thereby creating the optical illusion of motion.

The present invention contemplates the use of large film pictures, as large as two inches square, more or less. This greatly facilitates the making of handicraft animated cartoons and hand colored films. More dense and vivid coloring can be accomplished than on the conventional 16 mm. or 35 mm. film with their microscopic pictures. Since under the present invention the picture is enlarged a fewer number of times when projected a given distance, the color projection is consequently more vivid, distortion of the screen image is less, and the illumination is greater for a given wattage. This is a great advantage in outdoor projection for advertising entertainment.

Any appropriate film, either transparent or translucent, can be used for 34, 35.

Figure 8:
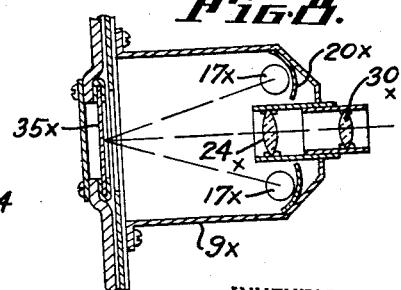
Fig. 8 is a fragmentary detail in horizontal section through the axis of the projecting lens, diagrammatically illustrating the manner of adapting the present apparatus to the projection of opaque films.

Projectors such as illustrated in Fig. 8 may be substituted for A and B if it is desired to project pictures from opaque paper or the fabric strips 35x. The opaque projector has the annular reflector 20x behind the light sources 17x within the casing 9x. The picture on 35x is in the focal plane of the suitable lenses such as 24x—30x that are focused on the screen 31.

This apparatus is adapted to be used for either reflected projection of opaque pictures or for transparent film projection by merely substituting appropriate projectors on the walls 13, 14. For further details in this connection, see my copending application Serial No. 226,318, filed August 23, 1938, now Patent 2,186,052, of which this application is a continuation in part.

In providing transparent and translucent film strips and opaque ribbons I have used a variety of materials: ordinary Cellophane, the heaviest, #600; laminated Cellophane, such as "Do-plex cellulose film"; standard motion picture film; good qualities of parchment paper. By experimental treating or processing I have made satisfactory, durable film strips from selected qualities of cotton and linen fabrics. I have found on the open market processed cotton and silk fabrics that may be cut into film strips and used without further treatment.

Some of the above material and also selective qualities of ordinary paper meet the requirements for opaque film strips.

Having thus described this invention, what I claim and desire to secure by Letters Patent is:

1. A motion picture machine having a bed; a pair of projectors adjustably mounted on said bed and adapted to focus on a common center on a screen; a flexible drive shaft extending across and mounted in bearings on said projectors; a pair of independent picture films with pictures imprinted on same by means other than a photographic process; counter shafts on said projectors respectively and having film feed rollers thereon driven by mutilated pinions meshing with similar gears on said drive shaft; shutters on said projectors respectively; shutter arms pivoted on said projectors and engaging said shutters; and impact cams on said shaft engaging lateral projections on said arms in timed relation to said mutilated gearing, said shutters respectively being provided with openings adapted to register with the exposure positioned pictures on the respective films, only one opening at a time being adapted to be in a registering position; said connective means between said shaft and said respective shutters being so arranged that during the rotation of the shaft the respective shutters are adapted to remain continuously at rest, except for instantaneous movements respectively, from registering position to interposing position, and from interposing position to registering position; and means for rotating said shaft; whereby the images of the characters on said films are projected on the screen in alternate sequence between the films.

2. A motion picture machine having a bed; a pair of base plates engaging a common pivot on said bed; vertical front walls mounted on each of said plates and integral therewith; projectors in separate casings adjustably mounted on each of said plates; means for feeding opaque picture ribbons through said motion picture machine; light means mounted in each of said casings so that the rays therefrom do not pass directly through the lenses; and means for reflecting the light rays upon said ribbons and causing the images of the illuminated pictures thereon to be projected through the respective lenses of the projectors upon a suitable surface at the focus of the light rays; a drive shaft extending acrosss said motion picture machine and having a universal joint substantially in alinement with said pivot; means including film feed rollers and tension rollers thereon for intermittently feeding said ribbons through said motion picture machine and back of said projectors respectively and actuated by said drive shaft; separate shutters provided with openings adapted to register with the pictures on the respective ribbons synchronously driven by said shaft in alternate relation to said film feeds, the openings of the shutters being so arranged and means for the movement of the respective shutters so timed, that when a picture is in an exposure position the opening of the respective shutter registers with the picture and the shutter remains at rest for the full time the picture is in its exposure position; and means whereby the opaque portions of the said shutters respectively are instantaneously interposed between said pictures and said projection surface at the moment when said pictures respectively begin to move away from their respective exposure positions.

3. A motion picture machine having a bed; a pair of base plates engaging a common pivot on said bed; projectors mounted on each of said plates; means for adjustably swinging said base plates on said pivot so that said projectors are accurately focused at a common center on a projection surface; light means mounted behind said projectors so that the rays therefrom pass directly through the projectors, and are focused at a predetermined distance from said projectors; a drive shaft extending across and mounted in bearings on said projectors and having a universal joint substantially in alinement with said pivot; means for intermittently feeding films through said projectors respectively and actuated by said drive shaft, said means including film feed rollers for each film with tension rollers thereon; separate shutters for each projector synchronously driven by said shaft in alternate relation to said film feeds, said shutters respectively being provided with openings adapted to register with the exposure positioned pictures on the respective films, only one opening at a time being adapted to be in a registering position; shutter arms pivoted transversely to said shaft on said projectors respectively, and engaging said shutters; impact shoulders on opposite sides of said arms; cams on said shaft on the opposite sides of said arms respectively in operative relation to said shoulders; the said connective means between said shaft and said respective shutters so arranged that during the rotation of the shaft the respective shutters are adapted to remain continuously at rest, except for instantaneous movements respectively, from registering position to interposing position, and from interposing position to registering position; and means for rotating said shaft.

4. A motion picture machine having a bed; a pair of base plates engaging a common pivot on said bed; vertical walls mounted on each of said plates and integral therewith; a projector adjustably mounted upon each of said plates; means for adjustably swinging said base plates on said pivot so that said projectors are accurately focused at a common center on a projection surface; a drive shaft extending across and mounted in bearings on said projectors and having a universal joint substantially in alinement with said pivot; means for intermittently feeding picture films through said projectors respectively and actuated by said drive shaft; light means mounted behind said projectors respectively so that the rays therefrom pass directly through the said films and the lenses of said projectors, in alternate sequence, whereby the images of the pictures on the said films are projected through the lenses of the respective projectors upon a suitable surface at the focus of the light rays; means for guiding films through said projectors respectively; countershafts on said projectors respectively and having film feeding rollers thereon engageable with said films; tension rollers in offset relation to said feeding rollers respectively; said tension rollers being journaled in the upper ends of slideably guided rods; said rods being under the tension of adjustably anchored springs; said film feeding rollers for each film having intermittent gear connections with the operating shaft, respectively, so that only one film is moved at one time to an exposure position for a set of characters and so that the films are successively moved to such exposure positions by the rotation of the shaft; separate shutters on said projectors respectively, and provided with openings adapted to register with the pictures on the respective films; shutter arms pivoted transversely to said shaft on said projectors respectively, and engaging said shutters; impact shoulders on opposite sides of said arms; cams on said shaft on the opposite sides of said arms respectively in operative relation to said shoulders; and means for driving said shaft; means connected with the shutters and operating in conjunction with the cams for moving the respective shutters to or from the registering position of the openings, only one opening at a time adapted to be in a registering position; means provided whereby the respective shutters remain at rest so that the openings in same shall register successively with the characters on the ribbons at a time when a set of characters is in the exposure position; and means provided whereby the opaque portions of said shutters respectively are instantaneously interposed between said characters on said ribbons and said projection surface at the end of each exposure period.

5. A motion picture machine having a bed; a pair of motion picture projectors on said bed and adapted to focus on a common center on a screen; means for intermittently feeding picture films through said projectors respectively, said picture films adapted to have pictures imprinted on same by means other than a photographic process; light means mounted behind the respective projectors so that the rays therefrom are projected through the said films and through the lenses of the said projectors to a common center on a screen; shutters interposed between said films and said screen, said shutters respectively being provided with openings adapted to register with the exposure positioned pictures on the respective films, only one opening at a time being adapted to be in a registering position; a drive shaft geared to said film feeds and shutters; shutter arms pivoted transversely to said shaft on said projectors respectively, and engaging said shutters; impact shoulders on the opposite sides of said arms; cams on said shaft on the opposite sides of said arms respectively in operative relation to said shoulders; said connective means between said shaft and said respective shutters being so arranged that during the rotation of the shaft the respective shutters are adapted to remain continuously at rest, except for instantaneous movements respectively, from registering position to interposing position, and from interposing position to registering position; and means for rotating said shaft whereby the images of the characters on said films are projected on the said screen in alternate sequence between the films.

6. A motion picture machine having a bed; a pair of base plates engaging a common pivot on said bed; vertical front walls on each of said plates and integral therewith; a drive shaft extending across and mounted in bearings on said vertical front walls and having a universal joint substantially in alinement with said pivot; interspaced channel guides respectively on said vertical front walls, adapted to guide independent picture films respectively through said motion picture machine; counter shafts respectively on said vertical front walls and having film feed rollers thereon engageable with said films, and actuated by said drive shaft; tension rollers in offset relation to said feeding rollers respectively; said tension rollers being journaled in the upper ends of slidably guided rods; said rods being under the tension of adjustably anchored springs; said film feed rollers for each film having mutilated gear connections respectively with the operating shaft, so that only one film is moved at one time to an exposure position for a set of characters and so that the films are successively moved to such exposure positions by the rotation of the shaft; separate shutters on said vertical front walls respectively, and provided with openings adapted to register with the exposure-positioned pictures on the respective films; shutter arms pivoted transversely to said shaft on said vertical front walls respectively, and engaging said shutters; impact shoulders on the opposite sides of said arms; cams on said shaft on the opposite sides of said arms respectively in operative relation to said shoulders; and means for driving said shaft.

7. A motion picture machine having a bed; a pair of base plates engaging a common pivot on said bed; vertical front walls on each of said plates and integral therewith; a drive shaft extending across and mounted in bearings on said vertical front walls and having a universal joint substantially in alinement with said pivot; interspaced channel guides respectively on said vertical front walls, adapted to guide independent picture films respectively through said motion picture machine; counter shafts respectively on said vertical front walls and having film feed rollers thereon engageable with said films, and actuated by said drive shaft; tension rollers in offset relation to said feeding rollers respectively; said tension rollers being journaled in the upper ends of slidably guided rods; said rods being under the tension of adjustably anchored springs; said film feed rollers for each film having mutilated gear connections respectively with the operating shaft, so that only one film is moved at one time to an exposure position for a set of characters and so that the films are successively moved to such exposure positions by the rotation of the shaft; separate shutters on said vertical front walls respectively, and provided with openings adapted to register with the exposure-positioned pictures on the respective films; shutter arms pivoted transversely to said shaft on said vertical front walls respectively, and engaging said shutters; impact shoulders on opposite sides of said arms; cams on said shaft on the opposite sides of said arms respectively in operative relation to said shoulders; and means for driving said shaft; projector lanterns, in separate casings, adapted to be adjustably mounted on the said vertical front walls and base plates of the said motion picture machine; and adapted to focus on a common center on a screen; objectives in said projector lanterns respectively adapted to be in axial alinement with the openings in said shutters and the exposure-positioned pictures on said films respectively; whereby the images of the pictures on said films by cooperative agreement between said shutters and said films and said actuating means, are projected on the screen in alternate sequence between the films.

8. A motion picture machine having a bed; a pair of base plates engaging a common pivot on said bed; motion picture projectors in separate casings adjustably mounted on said bed and adapted to focus on a common center on a screen; actuating means for the feeding of independent picture films through said projectors said films adapted to have pictures imprinted on same by means other than a photographic process; a drive shaft extending across and mounted in bearings on said motion picture machine and having a universal joint substantially in alinement with said pivot means for guiding films through said projectors respectively; countershafts on said motion picture machine and having film feed rollers thereon engageable with said films; tension rollers in offset relation to said feed rollers respectively; said tension rollers being journaled in the upper ends of slidably guided rods; said rods being under the tension of adjustably anchored springs; said film feed rollers for each film having intermittent gear connections with the operating shaft, so that only one film is moved at one time to an exposure position for a set of characters and so that the films are successively moved to such exposure position by the rotation of the shaft; separate shutters on said projectors respectively driven by said drive shaft and provided with openings adapted to register with the pictures on the respective films; shutter arms pivoted transversely to said shaft on said projectors respectively, and engaging said shutters; impact shoulders on opposite sides of said arms; cams on said shaft on the opposite sides of said arms respectively in operative relation to said shoulders; said connective means between said shaft and said shutters so arranged that during the rotation of the shaft the respective shutters are adapted to remain continuously at rest, except for instantaneous movements respectively, from registering position to interposing position, and from interposing position to registering position; only one opening at a time, on said respective shutters, adapted to be in registering position; and means for rotating said shaft; means including cooperative means between said drive shaft and said actuating means and said shutters whereby the images of the pictures on the respective films are projected on the screen in alternating sequence between the films.

CARL WALDEYER.